United States Patent
Chen (10) Patent No.: US 7,784,372 B1
(45) Date of Patent: Aug. 31, 2010

(54) DRIVE MECHANISM FOR MASSAGING DEVICE

(75) Inventor: Yuan-Chuen Chen, Fu Hsing (TW)

(73) Assignee: Hsin Hao Health Materials Co., Ltd., Fu Hsing (TW)

( * ) Notice: Subject to any disclaimer, the term of this patent is extended or adjusted under 35 U.S.C. 154(b) by 1111 days.

(21) Appl. No.: 11/454,771

(22) Filed: Jun. 16, 2006

(51) Int. Cl.
*F16H 27/02* (2006.01)

(52) U.S. Cl. ........................ 74/89.14; 601/99; 601/100; 601/103

(58) Field of Classification Search ................ 74/89.14, 74/640; 601/98, 99, 100, 101, 103, 115, 601/116
See application file for complete search history.

(56) References Cited

U.S. PATENT DOCUMENTS

| | | | | |
|---|---|---|---|---|
| 4,615,336 A | * | 10/1986 | Fijimoto | 601/99 |
| 5,877,570 A | * | 3/1999 | Chen | 310/75 R |
| 6,099,487 A | * | 8/2000 | Chen | 601/90 |
| 6,196,983 B1 | * | 3/2001 | Wu | 601/99 |
| 6,213,962 B1 | * | 4/2001 | Shimizu | 601/90 |
| 6,832,991 B1 | * | 12/2004 | Inada et al. | 601/99 |
| 6,848,401 B2 | * | 2/2005 | Takenaka et al. | 123/90.15 |
| 7,022,092 B2 | * | 4/2006 | Shimizu et al. | 601/99 |
| 2006/0206042 A1 | * | 9/2006 | Chen | 601/99 |

* cited by examiner

*Primary Examiner*—Richard W Ridley
*Assistant Examiner*—Matthew A Johnson
(74) *Attorney, Agent, or Firm*—Alan Kamrath; Kamrath & Associates PA (57) ABSTRACT

A driving mechanism for a massaging device includes a housing, a driven gear rotatably mounted in the housing, a driven shaft secured to a first side of the driven gear, and an adjusting shaft mounted on a second side of the driven gear. Thus, when the driven gear is rotatable in a first direction, the adjusting shaft and the driven shaft are rotated with the driven gear simultaneously, so that the two swinging members are moved in the same direction, and when the driven gear is rotatable in a second direction, the adjusting shaft and the driven shaft are rotated with the driven gear with a time lag, so that the two swinging members are moved in the opposite direction.

16 Claims, 7 Drawing Sheets

DRIVE MECHANISM FOR MASSAGING DEVICE

BACKGROUND OF THE INVENTION

1. Field of the Invention

The present invention relates to a driving mechanism and, more particularly, to a driving mechanism for a massaging device, such as a massaging chair.

2. Description of the Related Art

A conventional massaging device for a massaging chair or bed comprises two swinging members that are deflected in a sector shape to perform a massaging effect, and a link connected to the two swinging members to move the two swinging members upward and downward. The two swinging members are driven by a driving device so as to swing in the same direction or in the opposite direction to provide a massaging effect to the user. However, the two swinging members are driven to swing in the same direction or in the opposite direction, so that the massaging device only has a single massaging action, thereby limiting the massaging effect to the user.

BRIEF SUMMARY OF THE INVENTION

In accordance with the present invention, there is provided a driving mechanism, comprising a housing, a driven gear rotatably mounted in the housing, a driven shaft secured to a first side of the driven gear to rotate with the driven gear simultaneously, and an adjusting shaft mounted on a second side of the driven gear to rotate with the driven gear.

The primary objective of the present invention is to provide a driving mechanism, wherein when the driven gear is rotatable in the first direction, the adjusting shaft and the driven shaft are rotated with the driven gear simultaneously, so that the two swinging members are moved and swung in the same direction, and when the driven gear is rotatable in the second direction, the adjusting shaft and the driven shaft are rotated with the driven gear with a time lag, so that the two swinging members are moved and swung in the opposite direction.

Another objective of the present invention is to provide a driving mechanism, wherein the two swinging members are swung in the same direction and in the opposite direction to perform two different massaging actions, thereby enhancing the massaging effect of the massaging device.

A further objective of the present invention is to provide a driving mechanism, wherein the two swinging members are driven by a single driving mechanism to perform two different massaging actions, thereby decreasing costs of fabrication and simplifying the construction of the driving mechanism.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4, a driving mechanism for a massaging device in accordance with the preferred embodiment of the present invention comprises a housing 10, a driven gear 30 rotatably mounted in the housing 10, a driven shaft 40 secured to a first side of the driven gear 30 to rotate with the driven gear 30 simultaneously, and an adjusting shaft 50 mounted on a second side of the driven gear 30 to rotate with the driven gear 30.

Figure 4:
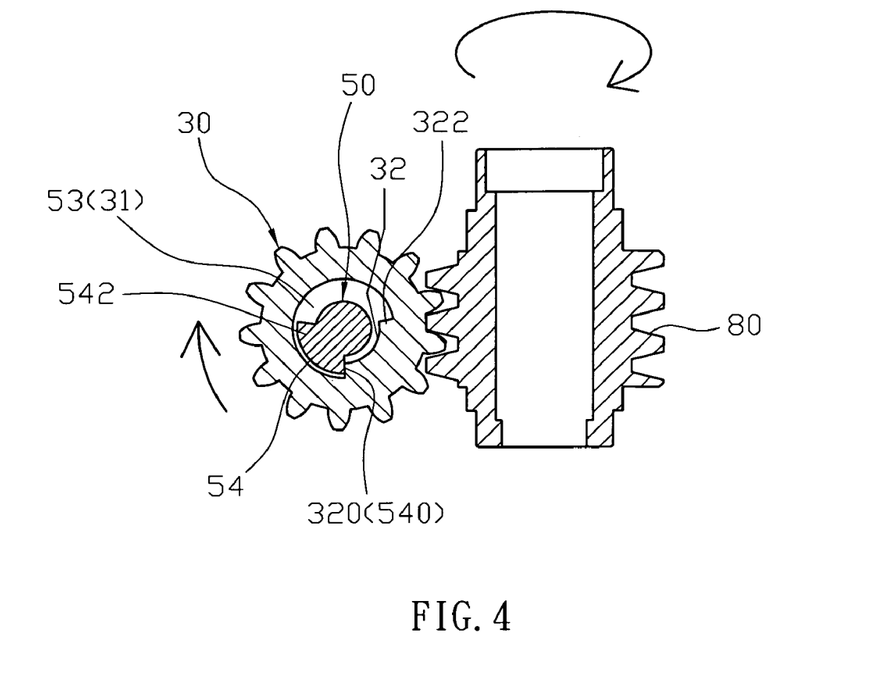
FIG. 4 is a partially plan cross-sectional view of the driving mechanism as shown in FIG. 1.
Figure 7:
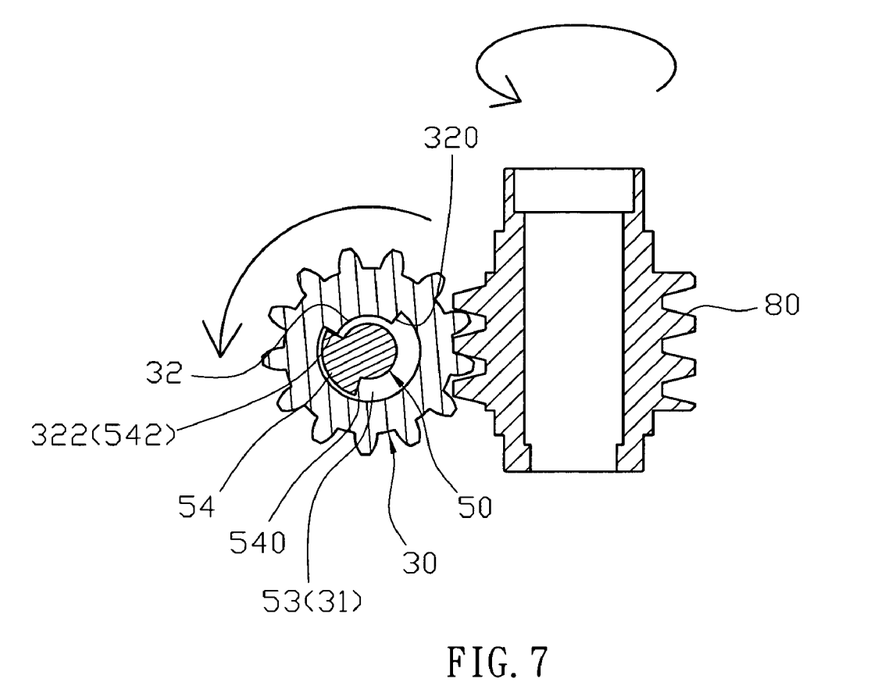
FIG. 7 is a schematic operational view of the driving mechanism as shown in FIG. 4.

Thus, the driven gear 30 is rotatable between a first direction as shown in FIG. 4 in which the adjusting shaft 50 is rotated with the driven gear 30 simultaneously, so that the adjusting shaft 50 and the driven shaft 40 are rotated with the driven gear 30 simultaneously, and a second direction as shown in FIG. 7 in which the adjusting shaft 50 is rotated with the driven gear 30 with a time lag, so that the adjusting shaft 50 and the driven shaft 40 are rotated with the driven gear 30 with a time lag.

The driven shaft 40 is integrally formed on the driven gear 30. The driven shaft 40 has a distal end formed with a connecting post 41 extending outwardly from the housing 10.

The second side of the driven gear 30 is formed with a mounting recess 31 for mounting the adjusting shaft 50. The mounting recess 31 of the driven gear 30 has a peripheral wall formed with a substantially arc-shaped push portion 32 having a first end 320 and a second end 322. The driven gear 30 has an inside formed with a mounting hole 34 connected to the mounting recess 31.

The adjusting shaft 50 has a first side formed with a substantially arc-shaped driven portion 54 rotatably mounted in the mounting recess 31 of the driven gear 30 and a substantially arc-shaped guide slot 53 to receive the push portion 32 of the driven gear 30 so that the push portion 32 of the driven gear 30 is rotatable in the guide slot 53 of the adjusting shaft 50. The driven portion 54 of the adjusting shaft 50 has a first end 540 rested on the first end 320 of the push portion 32 of the driven gear 30 and a second end 542 spaced from the second end 322 of the push portion 32 of the driven gear 30. The driven portion 54 and the guide slot 53 of the adjusting shaft 50 form an entire circle. The driven portion 54 of the adjusting shaft 50 and the push portion 32 of the driven gear 30 form a semi-circle. The first side of the adjusting shaft 50 is formed with a protruding axle 52 mounted in the mounting hole 34 of the driven gear 30 so that the driven gear 30 is rotatable on the adjusting shaft 50. The adjusting shaft 50 has a second side formed with a connecting post 55 extending outwardly from the housing 10. The adjusting shaft 50 has a peripheral wall formed with a mounting portion 51 for mounting a mounting ring 60 which is located between the driven gear 30 and the adjusting shaft 50.

Thus, when the driven gear 30 is rotatable in the first direction as shown in FIG. 4, the first end 320 of the push portion 32 of the driven gear 30 is rested on the first end 540 of the driven portion 54 of the adjusting shaft 50 to push and rotate the driven portion 54 of the adjusting shaft 50, so that the adjusting shaft 50 is rotated with the driven gear 30 simultaneously, and when the driven gear 30 is rotatable in the second direction as shown in FIG. 7, the second end 322 of the push portion 32 of the driven gear 30 is movable to rest on the second end 542 of the driven portion 54 of the adjusting shaft 50 to push and rotate the driven portion 54 of the adjusting shaft 50 with a time lag, so that the adjusting shaft 50 is rotated with the driven gear 30 with a time lag.

The housing 10 has two opposite sides each formed with a through hole 11 for mounting the connecting post 41 of the driven shaft 40 and the connecting post 55 of the adjusting shaft 50 by a bearing 70 respectively.

The driving mechanism further comprises two eccentric rods 12 mounted on the connecting post 41 of the driven shaft 40 and the connecting post 55 of the adjusting shaft 50 respectively, and two swinging members 20 each mounted on the respective eccentric rod 12 to produce a swinging action by rotation of the connecting post 41 of the driven shaft 40 and the connecting post 55 of the adjusting shaft 50 respectively.

Figure 1:
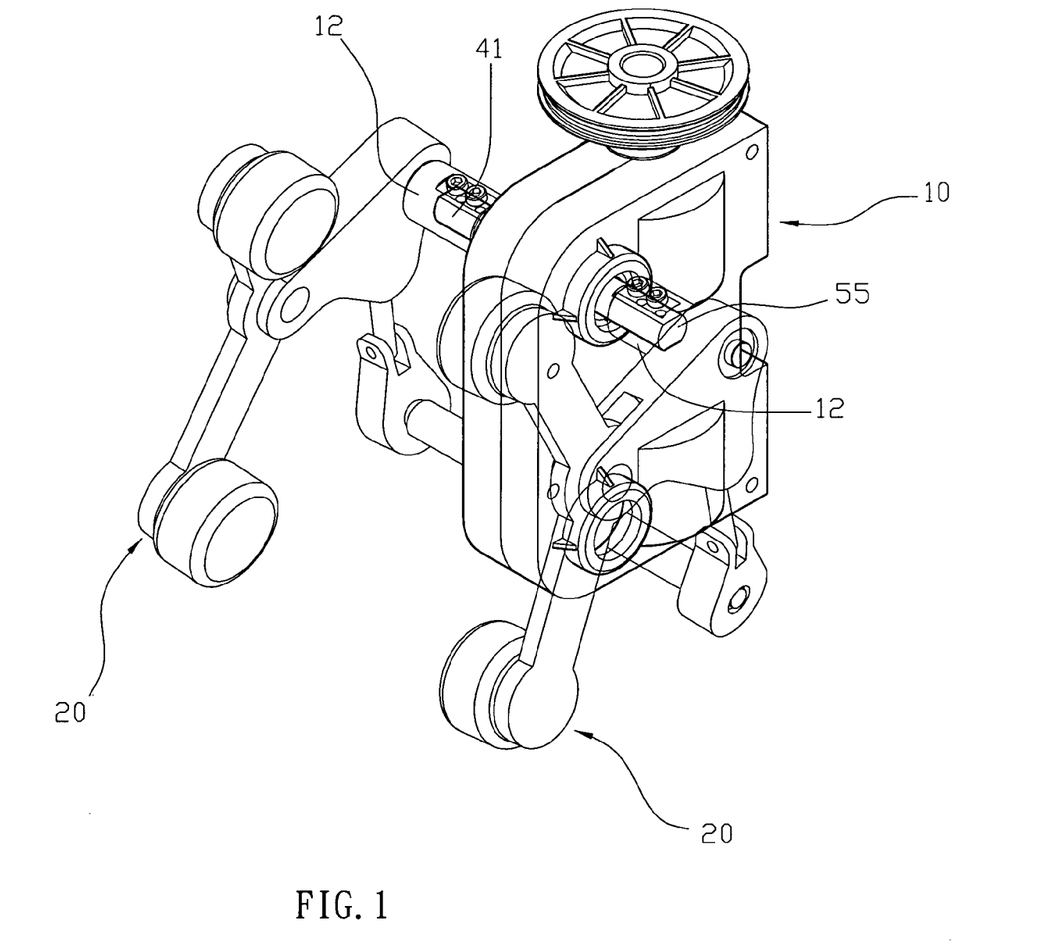
FIG. 1 is a perspective view of a driving mechanism in accordance with the preferred embodiment of the present invention.
Figure 2:
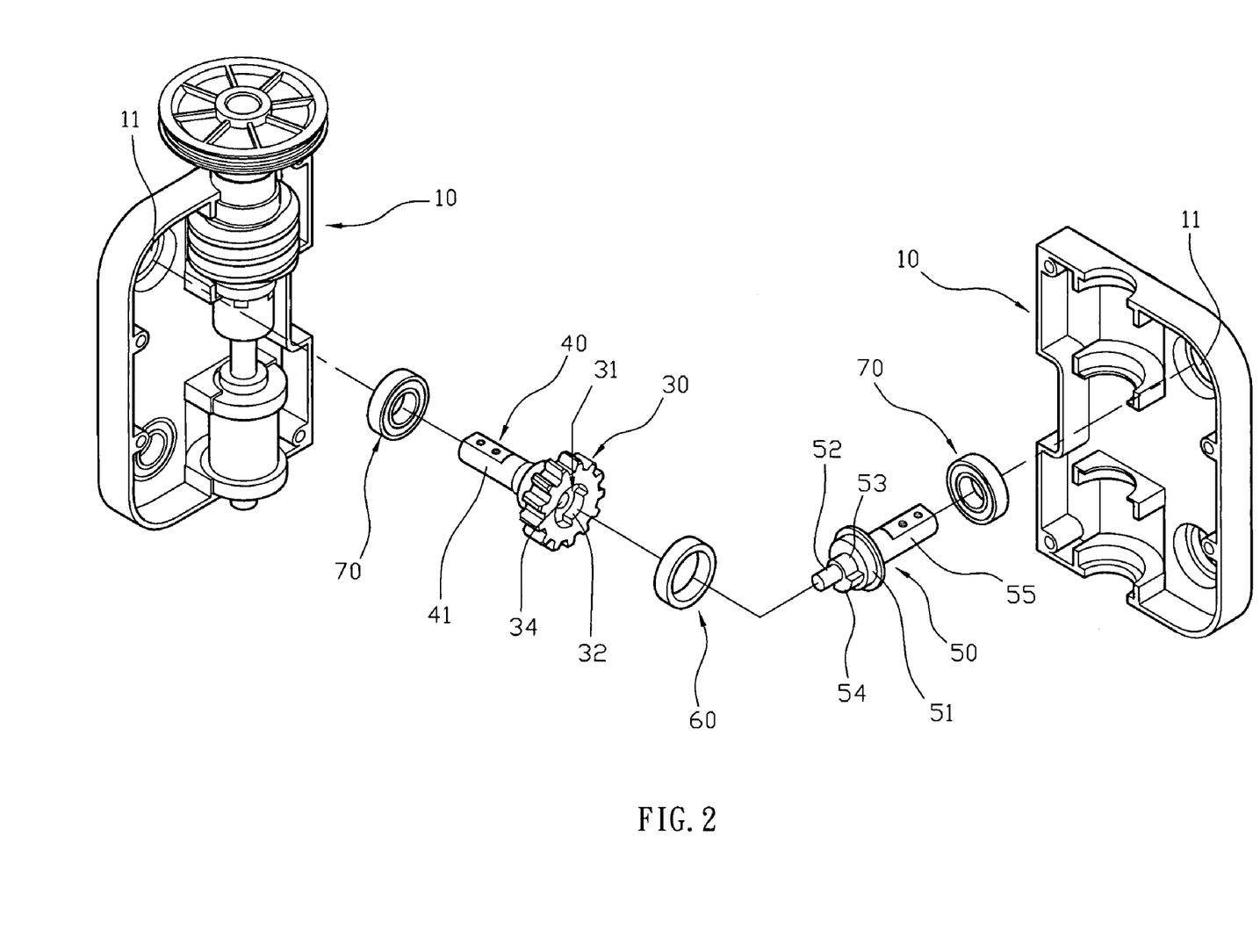
FIG. 2 is an exploded perspective view of the driving mechanism as shown in FIG. 1.
Figure 3:
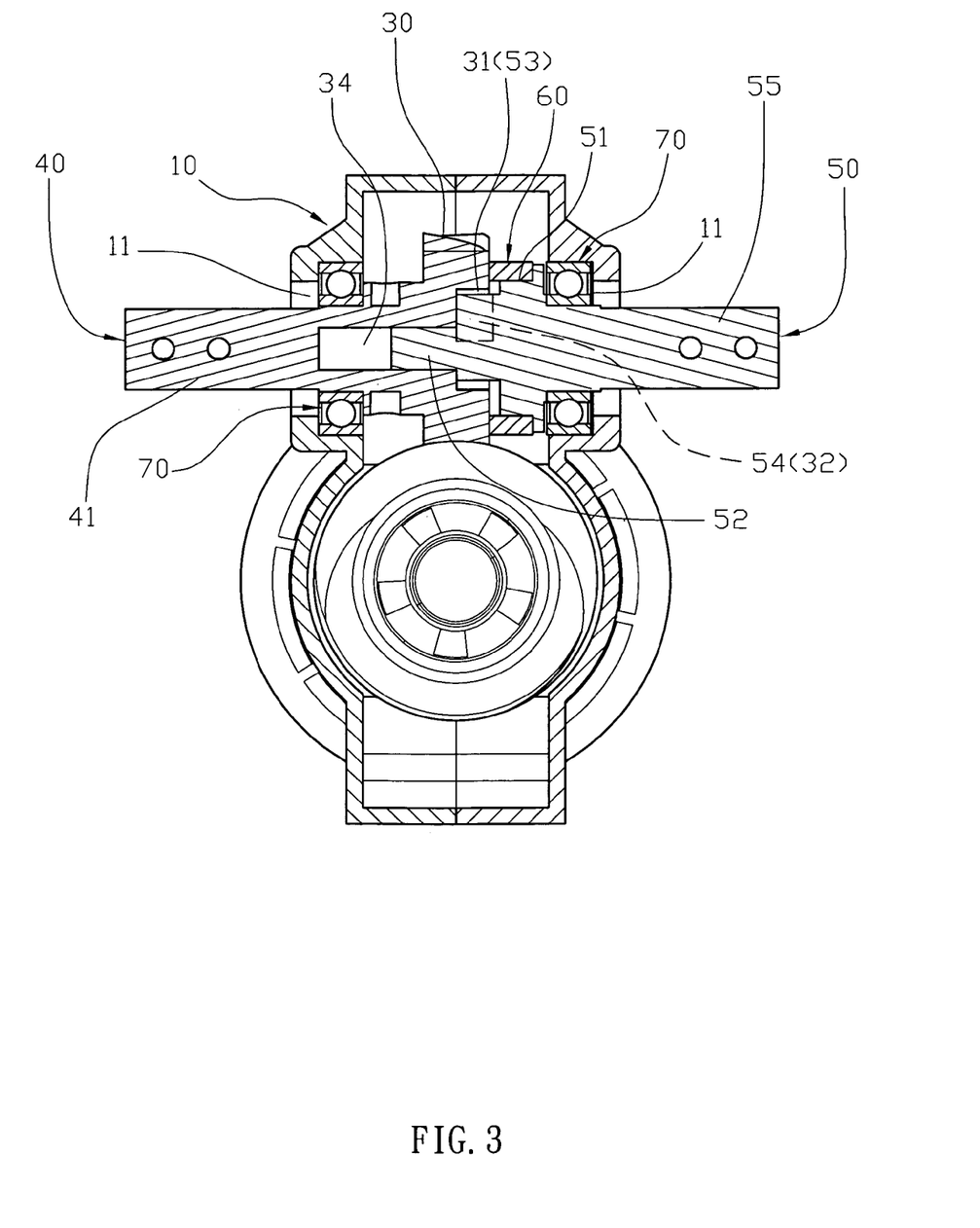
FIG. 3 is a plan cross-sectional view of the driving mechanism as shown in FIG. 1.
Figure 5:
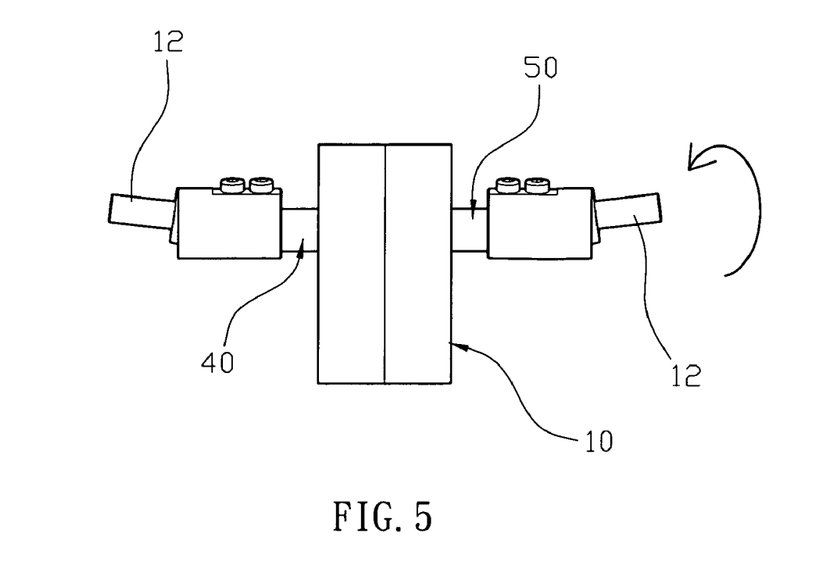
FIG. 5 is a partially plan view of the driving mechanism as shown in FIG. 1.
Figure 6:
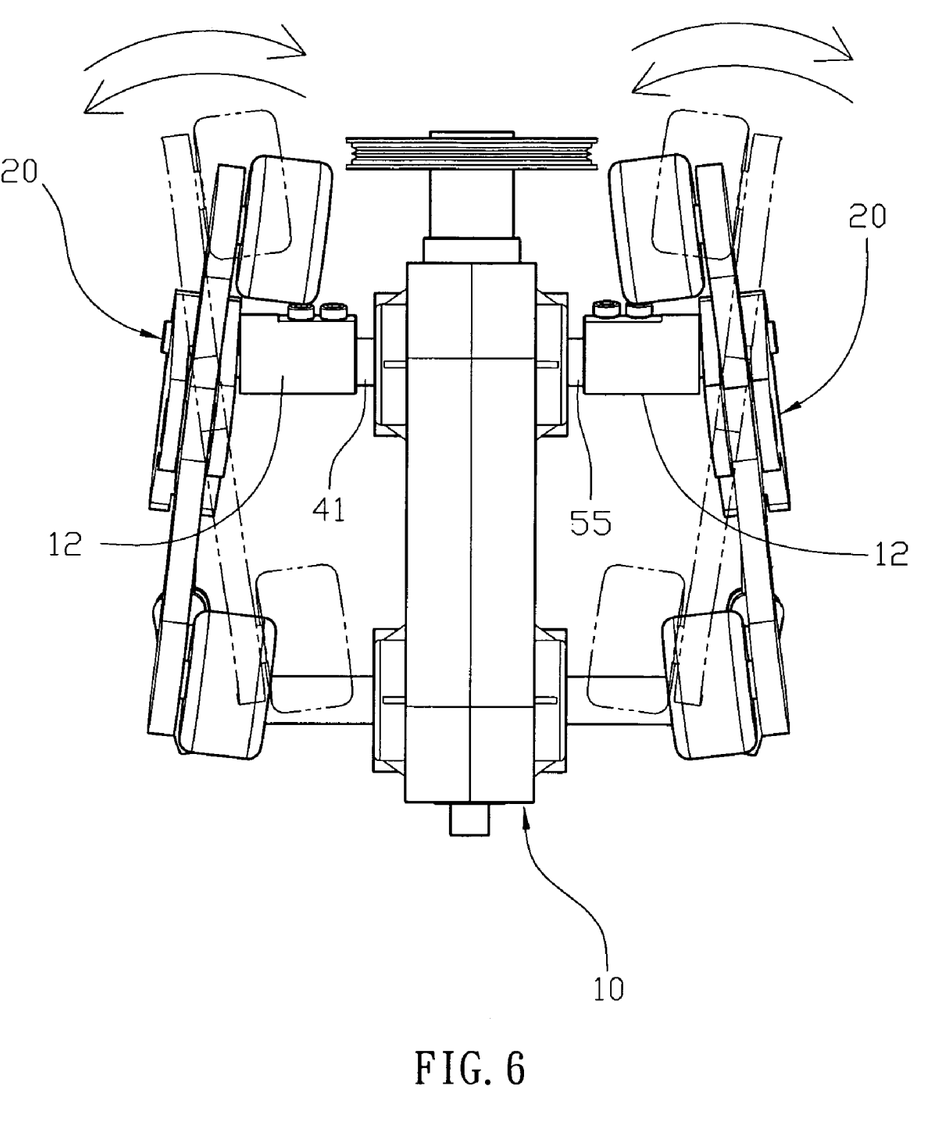
FIG. 6 is a schematic plan operational view of the driving mechanism as shown in FIG. 1.

In operation, referring to FIGS. 4-6 with reference to FIGS. 1-3, when the driven gear 30 is driven by a drive gear 80 to rotate in the first direction (clockwise) as shown in FIG. 4, the first end 320 of the push portion 32 of the driven gear 30 is rested on the first end 540 of the driven portion 54 of the adjusting shaft 50 to push the driven portion 54 of the adjusting shaft 50, so that the adjusting shaft 50 is rotated with the driven gear 30 simultaneously. Thus, the adjusting shaft 50 and the driven shaft 40 are rotated with the driven gear 30 simultaneously, so that the two swinging members 20 (and the two eccentric rods 12) are moved and swung in the same direction as shown in FIG. 6.

Figure 8:
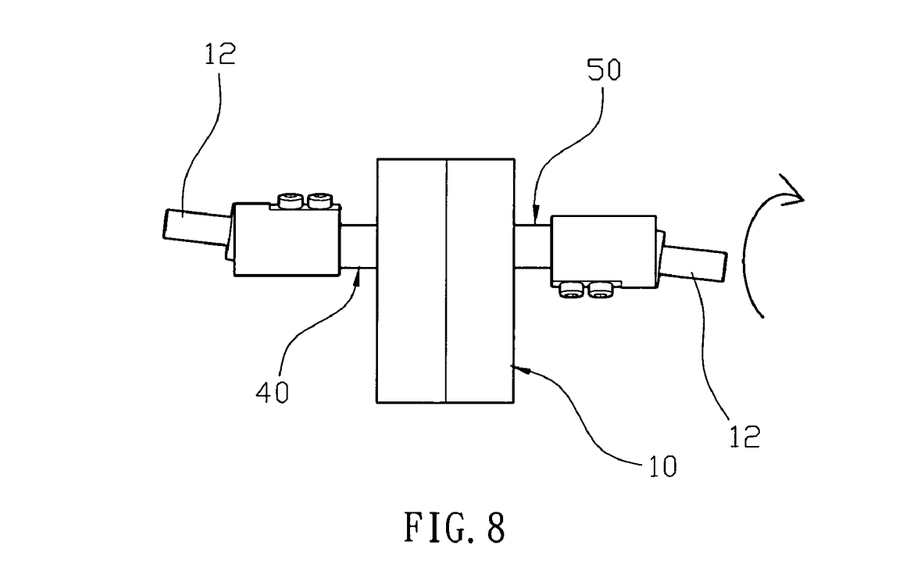
FIG. 8 is a schematic operational view of the driving mechanism as shown in FIG. 5.
Figure 9:
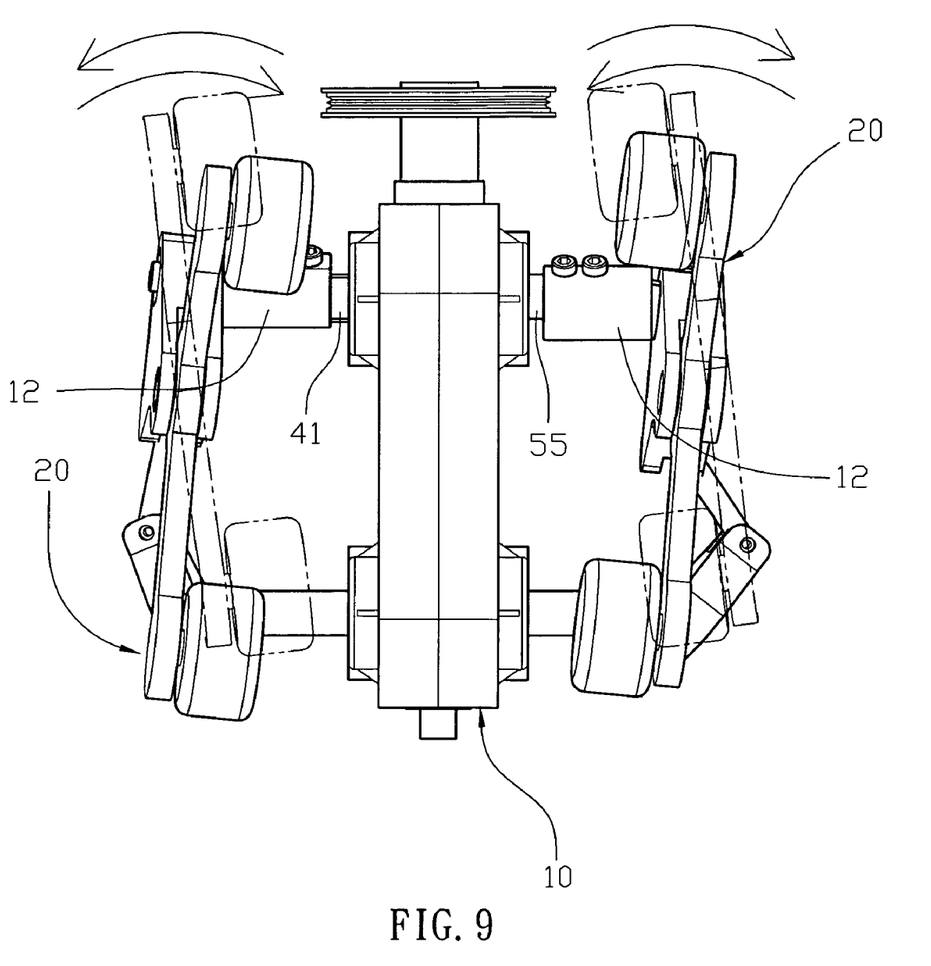
FIG. 9 is a schematic operational view of the driving mechanism as shown in FIG. 6.

On the contrary, referring to FIGS. 7-9 with reference to FIGS. 1-6, when the driven gear 30 is driven by a drive gear 80 to rotate in the second direction (counterclockwise) as shown in FIG. 7, the second end 322 of the push portion 32 of the driven gear 30 is movable to rest on the second end 542 of the driven portion 54 of the adjusting shaft 50 to push the driven portion 54 of the adjusting shaft 50 with a time lag (through 180 degrees), so that the adjusting shaft 50 is rotated with the driven gear 30 with a time lag, that is, the push portion 32 of the driven gear 30 idles in the guide slot 53 of the adjusting shaft 50 through a semi-circle. Thus, the adjusting shaft 50 and the driven shaft 40 are rotated with the driven gear 30 with a time lag (through 180 degrees), that is, the adjusting shaft 50 is rotated with the driven gear 30 after the driven shaft 40 is rotated through 180 degrees, so that the two swinging members 20 (and the two eccentric rods 12) are moved and swung in the opposite direction as shown in FIG. 9.

Accordingly, when the driven gear 30 is rotatable in the first direction, the adjusting shaft 50 and the driven shaft 40 are rotated with the driven gear 30 simultaneously, so that the two swinging members 20 are moved and swung in the same direction, and when the driven gear 30 is rotatable in the second direction, the adjusting shaft 50 and the driven shaft 40 are rotated with the driven gear 30 with a time lag, so that the two swinging members 20 are moved and swung in the opposite direction. In addition, the two swinging members 20 are swung in the same direction and in the opposite direction to perform two different massaging actions, thereby enhancing the massaging effect of the massaging device. Further, the two swinging members 20 are driven by a single driving mechanism (by the driven gear 30) to perform two different massaging actions, thereby decreasing costs of fabrication and simplifying the construction of the driving mechanism.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A driving mechanism, comprising:
   a housing;
   a driven gear rotatably mounted in the housing;
   a driven shaft secured to a first side of the driven gear to rotate with the driven gear simultaneously;
   an adjusting shaft mounted on a second side of the driven gear to rotate with the driven gear;
   wherein the second side of the driven gear is formed with a mounting recess for mounting the adjusting shaft;
   the mounting recess of the driven gear has a circular shape and a peripheral wall formed with a substantially arc-shaped protruding push portion, the push portion of the driven gear extends radially and inwardly from the peripheral wall of the mounting recess, and the push portion of the driven gear extends into the mounting recess of the driven gear;
   the adjusting shaft has a first side formed with a substantially arc-shaped driven portion inserted into and mounted in the mounting recess of the driven gear and a substantially arc-shaped guide slot to receive the push portion of the driven gear so that the push portion of the driven gear is rotatable in the guide slot of the adjusting shaft;
   the push portion of the driven gear has a first end and a second end;
   the driven portion of the adjusting shaft has a first end rested on the first end of the push portion of the driven gear and a second end spaced from the second end of the push portion of the driven gear;
   the driven gear is rotatable relative to the adjusting shaft to drive and rotate the adjusting shaft;
   the push portion of the driven gear is rotatable relative to the driven portion of the adjusting shaft to abut and push the driven portion of the adjusting shaft.

2. The driving mechanism in accordance with claim 1, wherein the driven gear is rotatable between a first direction in which the adjusting shaft is rotated with the driven gear simultaneously, so that the adjusting shaft and the driven shaft are rotated with the driven gear simultaneously, and a second direction in which the adjusting shaft is rotated with the driven gear with a time lag, so that the adjusting shaft and the driven shaft are rotated with the driven gear with a time lag.

3. The driving mechanism in accordance with claim 1, wherein the driven portion and the guide slot of the adjusting shaft form an entire circle.

4. The driving mechanism in accordance with claim 1, wherein the driven portion of the adjusting shaft and the push portion of the driven gear form a semi-circle when the first end of the push portion abuts the first end of the driven portion or when the second end of the push portion abuts the second end of the driven portion.

5. The driving mechanism in accordance with claim 1, wherein the driven gear has an inside formed with a mounting hole connected to the mounting recess, and the first side of the adjusting shaft is formed with a protruding axle which protrudes outwardly from the driven portion and is mounted in the mounting hole of the driven gear so that the driven gear is rotatable on the adjusting shaft.

6. The driving mechanism in accordance with claim 1, wherein the adjusting shaft has a peripheral wall formed with a mounting portion for mounting a mounting ring which is rotatably mounted on the mounting portion of the adjusting shaft and is located between the driven gear and the adjusting shaft.

7. The driving mechanism in accordance with claim 5, wherein
the adjusting shaft has a second side formed with a connecting post extending outwardly from the housing, and the driven shaft has a distal end formed with a connecting post extending outwardly from the housing;
the mounting hole of the driven gear is located between the mounting recess of the driven gear and the connecting post of the driven shaft.

8. The driving mechanism in accordance with claim 1, wherein the driven shaft is integrally formed on the driven gear.

9. The driving mechanism in accordance with claim 2, wherein when the driven gear is rotatable in the first direction, the first end of the push portion of the driven gear is rested on the first end of the driven portion of the adjusting shaft to push and rotate the driven portion of the adjusting shaft, so that the adjusting shaft is rotated with the driven gear simultaneously, and when the driven gear is rotatable in the second direction, the second end of the push portion of the driven gear is movable to rest on the second end of the driven portion of the adjusting shaft to push and rotate the driven portion of the adjusting shaft with a time lag, so that the adjusting shaft is rotated with the driven gear with a time lag.

10. The driving mechanism in accordance with claim 7, wherein the housing has two opposite sides each formed with a through hole for mounting the connecting post of the driven shaft and the connecting post of the adjusting shaft by a bearing respectively.

11. The driving mechanism in accordance with claim 7, further comprising two eccentric rods mounted on the connecting post of the driven shaft and the connecting post of the adjusting shaft respectively, and two swinging members each mounted on the respective eccentric rod to produce a swinging action by rotation of the connecting post of the driven shaft and the connecting post of the adjusting shaft respectively.

12. The driving mechanism in accordance with claim 11, wherein when the adjusting shaft and the driven shaft are rotated with the driven gear simultaneously, the two swinging members are moved and swung in the same direction.

13. The driving mechanism in accordance with claim 11, wherein when the adjusting shaft and the driven shaft are rotated with the driven gear with a time lag, the two swinging members are moved and swung in the opposite direction.

14. The driving mechanism in accordance with claim 2, wherein when the driven gear is rotatable in the second direction, the adjusting shaft is rotated with the driven gear after the driven shaft is rotated through 180 degrees.

15. The driving mechanism in accordance with claim 1, wherein
the driven gear directly drives and rotates the adjusting shaft by an engagement between the push portion of the driven gear and the driven portion of the adjusting shaft;
the first end of the push portion of the driven gear is movable to abut and push the first end of the driven portion of the adjusting shaft; and
the second end of the push portion of the driven gear is movable to abut and push the second end of the driven portion of the adjusting shaft.

16. The driving mechanism in accordance with claim 1, wherein the driven portion of the adjusting shaft is fully received in and surrounded by the mounting recess of the driven gear.

* * * * *